(12) United States Patent
Inoue

(10) Patent No.: US 7,366,320 B2
(45) Date of Patent: Apr. 29, 2008

(54) INFORMATION-EMBEDDING APPARATUS, ENCODER, TAMPER-DETECTING APPARATUS, INFORMATION-EMBEDDING METHOD, TAMPER-DETECTING METHOD, AND RECORDING MEDIUM HAVING PROGRAM RECORDED THEREIN FOR EXECUTING BOTH OF THE METHODS

(75) Inventor: Hisashi Inoue, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 761 days.

(21) Appl. No.: 10/636,690

(22) Filed: Aug. 8, 2003

(65) Prior Publication Data

US 2006/0013488 A1    Jan. 19, 2006

(30) Foreign Application Priority Data

Aug. 9, 2002    (JP) .............................. 2002-232398

(51) Int. Cl.
*G06K 9/00*    (2006.01)

(52) U.S. Cl. .................................... 382/100

(58) Field of Classification Search ................ 382/100; 358/3.28
See application file for complete search history.

(56) References Cited

U.S. PATENT DOCUMENTS 6,064,764 A    5/2000    Bhaskaran et al.
6,275,599 B1 *    8/2001    Adler et al. ................ 382/100
2004/0264732 A1 *    12/2004    Tian .......................... 382/100

FOREIGN PATENT DOCUMENTS

| JP | 10-164549 | 6/1998 |
|---|---|---|
| JP | 10-191330 | 7/1998 |
| JP | 11-98487 | 4/1999 |
| JP | 11-331548 | 11/1999 |
| JP | 11-341268 | 12/1999 |
| JP | 2001-203878 | 7/2001 |
| JP | 2002-94769 | 3/2002 |
| WO | 02/21846 | 3/2002 |
| WO | 02/23468 | 3/2002 |

\* cited by examiner

*Primary Examiner*—Colin LaRose
(74) *Attorney, Agent, or Firm*—Wenderoth, Lind & Ponack, L.L.P.

(57) ABSTRACT

A digital image signal based on transformed in frequency, thereby providing partitioned frequency components. Characteristic information is calculated in accordance with a coefficient at a first frequency domain that is selected from among the partitioned frequency components. A coefficient at a second frequency domain is handled in accordance with predetermined rules, thereby embedding the characteristic information into the coefficient at the second frequency domain. The second frequency domain is selected from among areas that differ from the first frequency domain. The frequency coefficients that exhibit several frequency components are encoded in a predetermined manner, thereby producing compressed image data.

13 Claims, 12 Drawing Sheets

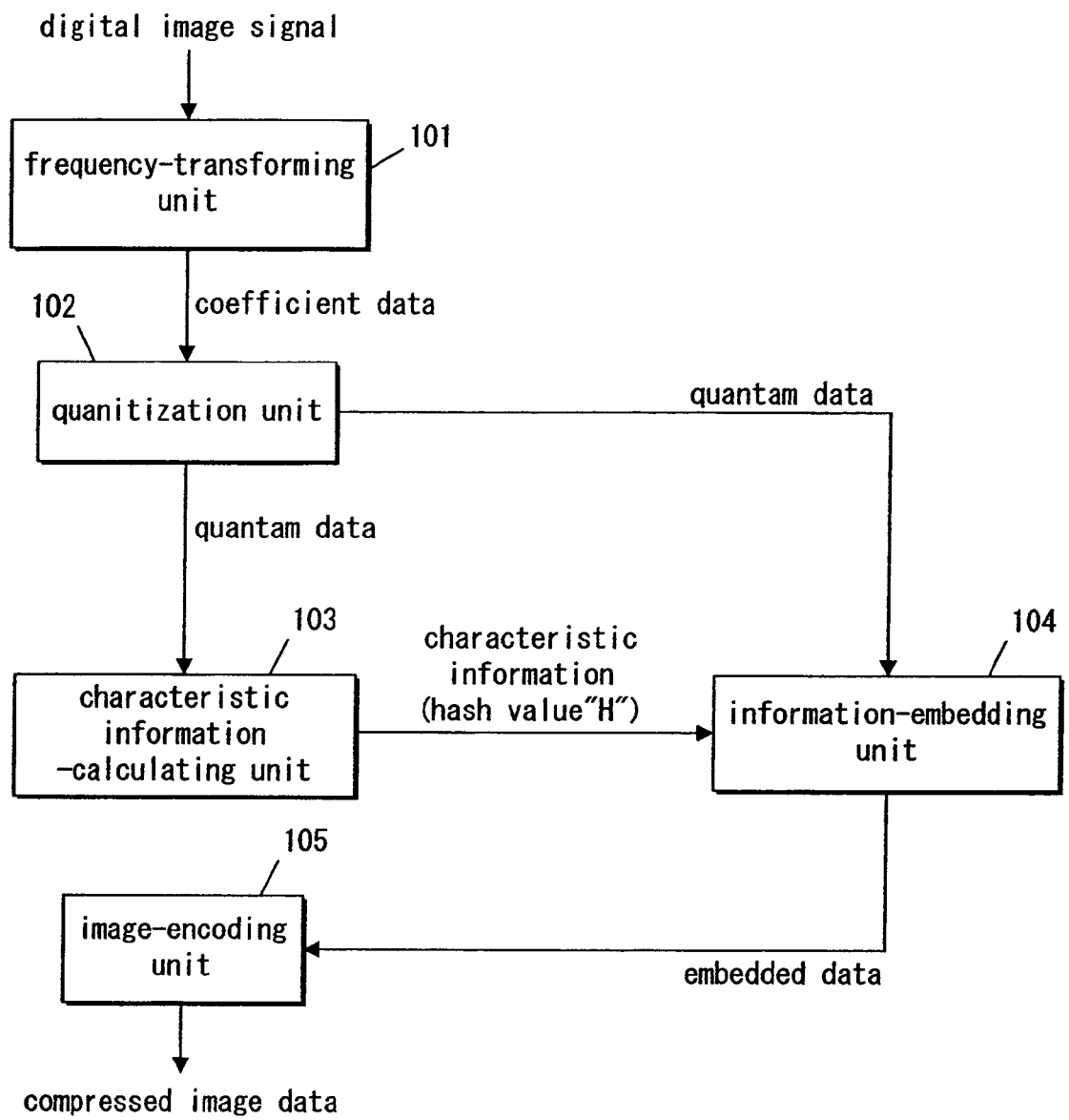

original image (pixel domains)

(frequency domains)

original image (pixel domains)

(frequency domains)

e.g. n=8 image data D

2002/Aug.

image region D1 encrypted digest "H"

image region D2 synthesized image data

INFORMATION-EMBEDDING APPARATUS, ENCODER, TAMPER-DETECTING APPARATUS, INFORMATION-EMBEDDING METHOD, TAMPER-DETECTING METHOD, AND RECORDING MEDIUM HAVING PROGRAM RECORDED THEREIN FOR EXECUTING BOTH OF THE METHODS

BACKGROUND OF THE INVENTION

1. Field of the Invention

The present invention relates to information-embedding apparatus, a tamper-detecting apparatus, and arts related thereto. More particularly, it relates to an art of embedding characteristic information as a digital watermark into compressed image data in response to the image compression of a digital image signal, in which the characteristic information is embedded to determine whether or not the compressed image data has been tampered with, and further relates to an art of detecting the embedded characteristic information.

2. Description of the Related Art

In recent years, there has been an increasing demand for a surveillance system which provides crime-proof security. In particular, users eagerly want lengthy recording and high-image quality in a field of a monitoring recorder.

As a result, a digital disc recorder rapidly prevails, which is designed to practice the image compression of digitized image data, and to record such compressed image data as digital information.

The use of commercially available image-processing software results in easy tamper (e.g., editing and processing) of such digital data.

Although the above description exemplifies the monitoring recorder and the digital disc recorder, the present invention is not limited thereto. The present invention is broadly applicable to image-processing arts.

There has been a continuing need to establish a tamper-detecting art that determines whether or not a digital image has been falsified. Electronic authentication is heretofore known as one of the established arts.

FIG. 13 briefly illustrates how prior art electronic authentication is practiced. A data transmitter of FIG. 13 applies a hash function to an original digital image, thereby providing a hash value. The data transmitter compresses the digital image in accordance with the hash value, thereby generating a digest.

The data transmitter encrypts the digest using consignor's private key. The data transmitter transmits both of the original digital image and the encrypted digest to a data receiver through a network.

The data receiver receives the above two different pieces of data through the network. The data receiver compresses the received digital image in accordance with the hash value, thereby producing a first digest. The data receiver decodes the received digest using a consignor's public key, thereby providing a second digest.

The data receiver compares the second digest with the first digest. When the first digest is coincident with the second, then it is determined that no tamper has been made to the digital image. Unless otherwise, a determination is made that the digital image has been tampered with.

The electronic authentication as discussed above requires that the data transmitter sends two different pieces of data (i.e., the original digital image and the encrypted digest) to the data receiver.

When a great number of digital images are present, then a data-managing apparatus operable to properly manage a relationship between the digital image and the digest is virtually essential.

Instead of the data-managing apparatus, there has heretofore been known a digital watermark-based art. A digital watermark is an art of embedding digital information into digital image data in such a manner as to preclude a human eye from perceiving the embedded digital information.

A tamper-detecting method using such a digital watermark art has been proposed. For example, patent reference No. 1 (published Japanese Patent Application Laid-Open No. 10-164549) discloses an image authentication system.

The following briefly discusses the image authentication system with reference to FIG. 14. Target image data "D" (see FIG. 14 (a)) photographed using a digital camera is split into two different image areas "D1", "D2". (See FIG. 14 (b)). The image area "D1" is used to generate a hash value. The image area "D2" has the generated hash value "H" embedded therein.

A digest-calculating unit (not shown) calculates hash value "H" on the basis of data contained at the image area "D1". Hash value "H" is encrypted using private keys that are different for each digital camera. The encrypted hash value "H" is embedded into the image area "D2".

As shown in FIG. 14 (c), a verification apparatus generates first hash value "H1" on the basis of the data at image area "D1".

The verification apparatus extracts the embedded hash value "H2" from the image area "D2", and decodes the extracted second hash value "H2" using a public key.

The verification apparatus compares the second hash value "H2" with the first hash value "H1" to determines whether or not the image data "D" has been falsified.

An art taught by patent reference No. 2 (published Japanese Patent Application Laid-Open No. 11-341268) partially decodes a compressed digital image, and then calculates hash values from all data blocks while a determination is made as to whether or not the hash values are embedded into the digital image in accordance with data block coefficients.

The art according to patent reference No. 2 again partially decodes the compressed digital image, and then replaces one bit of a coefficient at a block in which the hash value is to be embedded and one bit of the hash value with a watermark bit, thereby embedding the watermark bit into the digital image.

However, the art according to patent reference No. 1 executes the above processing in a pixel domain. This means that, when an image data change-involving process (e.g., image encoding) is made in the pixel domain, then first hash value "H1" and second hash value "H2" before such processing totally differ from those after the processing. As a result, it is impossible to practice verification by a comparison of one hash value with another. Consequently, using the art according to patent reference No. 1 it is impossible to detect possible tamper in a digital image that has experienced image compression.

The art according to patent reference No. 2 premises that compressed image data is decoded twice to embed the hash value into the digital image. In addition, the art according to patent reference No. 2 must change variable values that correspond to at least a coefficient. The variable values are provided in a commonly used quantization table. As a result, the art according to patent reference No. 2 involves very complicated processing to detect the possible tamper in the digital image.

Moreover, the arts according to patent references No. 1 and No. 2 make it impossible to distinguish intentional tamper (e.g., replacement of part of an image with another) from an image change due to irreversible image processing that is commonly practiced without malicious intent.

SUMMARY OF THE INVENTION

In view of the above, a first object of the present invention is to provide an art capable of simply detecting possible tamper in compressed image data.

A second object of the present invention is to provide an art having an affinity for image encoding.

A third object of the present invention is to provide an art capable of detecting the possible tamper before the compressed image data is completely decoded.

A fourth object of the present invention is to provide an art capable of distinguishing irreversible image processing from intentional tamper.

A first aspect of the present invention provides an information-embedding apparatus including a characteristic information-calculating unit operable to calculate characteristic information in accordance with a frequency coefficient at a first frequency domain among frequency coefficients obtained by the frequency transformation of a digital image signal, and including an information-embedding unit operable to embed the characteristic information into a frequency coefficient at a second frequency domain among the frequency coefficients obtained by the frequency transformation of the digital image signal, thereby providing embedded data. The second frequency domain being different from the first frequency domain.

A second aspect of the present invention provides an information-embedding apparatus including a frequency-transforming unit operable to practice the frequency transformation of a digital image signal, thereby providing frequency coefficients, a characteristic information-calculating unit operable to calculate characteristic information in accordance with a frequency coefficient at a first frequency domain among the frequency coefficients from the frequency-transforming unit, and an information-embedding unit operable to embed the characteristic information into a frequency coefficient at a second frequency domain among the frequency coefficients from the frequency-transforming unit, thereby providing embedded data. The second frequency domain being different from the first frequency domain.

A third aspect of the present invention provides an information-embedding apparatus including a frequency-transforming unit operable to practice the frequency transformation of a digital image signal, thereby providing frequency coefficients, a quantization unit operable to quantize the frequency coefficients from the frequency-transforming unit, thereby providing quantum data, a characteristic information-calculating unit operable to calculate characteristic information in accordance with quantum data at a first frequency domain among the quantum data from the quantization unit, and an information-embedding unit operable to embed the characteristic information into quantum data at a second frequency domain among the quantum data from the quantization unit, thereby providing embedded data. The second frequency domain being different from the first frequency domain.

The information-embedding apparatus as described above embeds the characteristic information into compressed image data while the compressed image data is being processed. This feature eliminates the need to repeatedly decode the compressed image data, and makes it feasible to more simply detect possible tamper in the compressed image data.

The information-embedding apparatus, as described above, embeds the characteristic information into a certain frequency domain, not into a pixel domain. This feature renders the characteristic information resistant to disappear, even with image processing in the pixel domain.

The information-embedding apparatus as described above is free to insert a characteristic information-embedding process into an image-compressing process. This feature allows the image-compressing process to have an affinity to the characteristic information-embedding process.

A fourth aspect of the present invention provides an information-embedding apparatus as defined in the first aspect of the present invention, further including an image-encoding unit operable to encode the embedded data from the information-embedding unit, thereby generating compressed image data.

In general, an image-encoding process has reversibility. The information-embedding apparatus according to the fourth aspect of the present invention embeds the characteristic information immediately before the image-encoding process. This feature securely retains the embedded characteristic information at the frequency domain, even with post-image compression.

A fifth aspect of the present invention provides an information-embedding apparatus as defined in the first aspect of the present invention, wherein the frequency transformation is either one of discrete wavelet transform, subband decomposition, discrete cosine transform, and Fourier transform.

The information-embedding apparatus according to the fifth aspect of the present invention provides frequency components that exhibit entire image data. This feature detects tamper with ease, even when only part of the image data is tampered with.

A sixth aspect of the present invention provides an information-embedding apparatus as defined in the first aspect of the present invention, wherein the characteristic information is an inherently expressible original value.

The information-embedding apparatus according the sixth aspect of the present invention provides the characteristic information inherently related to the original value. As a result, the characteristic information is a definite index to determine possible tamper.

A seventh aspect of the present invention provides an information-embedding apparatus as defined in the first aspect of the present invention, wherein the characteristic information is a hash value derived from an original value.

The information-embedding apparatus according the seventh aspect of the present invention employs the widely used hash value as the characteristic information. This feature realizes easy implementation.

An eighth aspect of the present invention provides an information-embedding apparatus as defined in the first aspect of the present invention, wherein the first and second frequency domains are lower in frequency than a highest frequency domain.

A frequency coefficient at a region lower in frequency than the highest frequency domain, in particularly at a lower frequency domain, is resistant to change with irreversible image processing. The information-embedding apparatus according to the eighth aspect of the present invention embeds the characteristic information into such a change-resistant region. This feature distinguishes image tamper with ease from the irreversible image processing.

A sixteenth aspect of the present invention provides a tamper-detecting apparatus including a characteristic information-calculating unit operable to calculate first characteristic information in accordance with a frequency coefficient at a first frequency domain among frequency coefficients obtained by the frequency transformation of a digital image signal, a characteristic information-extracting unit operable to extract second characteristic information in accordance with a frequency coefficient at a second frequency domain among the frequency coefficients obtained by the frequency transformation of the digital image signal, the second frequency domain being different from the first frequency domain, and a tamper-determining unit operable to determine the presence of tamper by a comparison of the first characteristic information with the second characteristic information.

The tamper-detection apparatus according to the sixteenth aspect of the present invention extracts the characteristic information, and then determines whether or not compressed image data has been falsified, while the compressed image data is being decoded.

A thirty-first aspect of the present invention provides a tamper-detecting apparatus including a characteristic information-calculating unit operable to calculate first characteristic information in accordance with a frequency coefficient at a first frequency domain among frequency coefficients obtained by the frequency transformation of a digital image signal, and a characteristic information-extracting unit operable to extract second characteristic information in accordance with a frequency coefficient at a second frequency domain among the frequency coefficients obtained by the frequency transformation of the digital image signal, the second frequency domain being different from the first frequency domain, a characteristic information-extracting unit operable to extract third characteristic information in accordance with a frequency coefficient at a third frequency domain among the frequency coefficients obtained by the frequency transformation of the digital image signal, the third frequency domain being different from the first and second frequency domains, and a tamper-determining unit operable to determine the presence of tamper by a comparison of two or greater different pieces of characteristic information among the first, second, and third characteristic information with each other, wherein the second frequency domain is higher in frequency than the first frequency domain, and the third frequency domain is higher in frequency than the second frequency domain, and wherein the tamper-determining unit determines image processing, not tamper, has been practiced, when the first characteristic information is coincident with the second characteristic information, but when the first characteristic information is different from the third characteristic information.

As described above, there are cases where the first characteristic information is coincident with the second characteristic information, but where the first characteristic information is different from the third characteristic information. As a result, the tamper-detecting apparatus according to the thirty-first aspect of the present invention makes it possible to differentiate intentional tamper from an image change due to image processing.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 1 is a block diagram illustrating an information-embedding apparatus according to a first embodiment of the present invention;

FIG. 2 (b) is a descriptive illustration showing frequency coefficients after discrete wavelet transform is executed according to the present invention;

FIG. 3 (b) is a descriptive illustration showing frequency coefficients after discrete cosine transform is executed according to the present invention;

FIG. 14 (b) is a descriptive illustration showing how the prior art image authentication system is operated; and FIG. 14 (c) is a descriptive illustration showing how the prior art image authentication system is operated.

DETAILED DESCRIPTION OF THE INVENTION

Figure 2A:
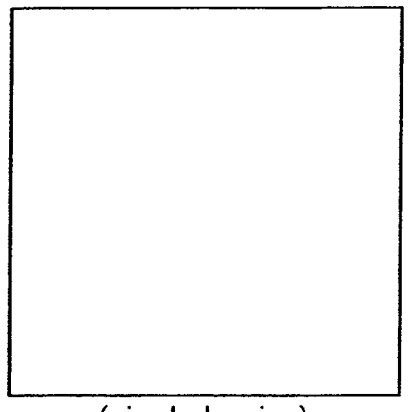
FIG. 2 (a) is a descriptive illustration showing an original image before discrete wavelet transform is executed according to the present invention.

Preferred embodiments of the present invention are now described in conjunction with the accompanying drawings.

First Embodiment

FIG. 1 is a block diagram illustrating an information-embedding apparatus according to a first embodiment. As illustrated in FIG. 1, the information-embedding apparatus according to the present embodiment includes a frequency-transforming unit 101, a quantization unit 102, a characteristic information-calculating unit 103, an information-embedding unit 104, and an image-encoding unit 105. The information-embedding apparatus including the image-encoding unit 105 may be an encoder.

The frequency-transforming unit 101 practices the frequency transformation of a digital image signal, thereby providing frequency coefficients (coefficient data).

The frequency-transforming unit 101 may practice, by way of the frequency transformation, any one of the following: discrete wavelet transform; subband decomposition; discrete cosine transform; and Fourier transform.

The quantization unit 102 quantizes the coefficient data from the frequency-transforming unit 101, thereby providing quantum data (quantized frequency coefficients).

The quantization unit 102 practices arbitrarily selectable quantization when the frequency coefficients are replaced by data that consists of a certain number of bits. For example, several frequency coefficients may collectively be vector-quantized.

The characteristic information-calculating unit 103 calculates characteristic information in accordance with quantum data at a first frequency domain among the quantum data from the quantization unit 102.

The characteristic information calculated by the characteristic information-calculating unit 103 is an inherently expressible original value. The characteristic information according to the present embodiment is a hash value derived from the original value.

Although the characteristic information according to the present embodiment is the hash value, the present invention is not limited thereto. For example, any characteristic information is acceptable, which changes to a totally different value in response to a change in frequency coefficient.

The information-embedding unit 104 embeds the characteristic information into quantum data at a second frequency domain among the quantum data from the quantization unit 102, thereby providing embedded data. The second frequency domain differs from the first frequency domain.

The first and second frequency domains are a lowest frequency area or an intermediate lower frequency area, both of which are lower in frequency than a highest frequency area. The first and second frequency domains will be discussed in detail later.

The image-encoding unit 105 encodes the embedded data from the information-embedding unit 104, thereby generating compressed image data.

Figure 2B:
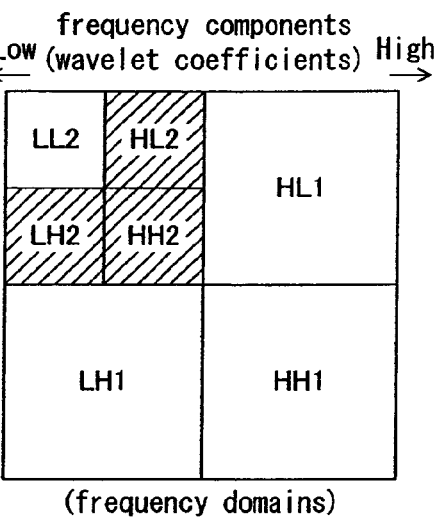

The following discusses, with reference to FIG. 2, how the discrete wavelet transform is employed as frequency transformation. FIG. 2 (*a*) shows an original image. FIG. 2 (*b*) illustrates frequency coefficients after the discrete wavelet transform is practiced.

In FIG. 2 (*b*), a frequency increases as arrows are positioned even closer to the right and bottom edge of FIG. 2 (*b*). The frequency decreases as the arrows are located even closer to the left and upper edge of FIG. 2 (*b*). Frequency component "HH1" belongs to the highest frequency area. Frequency component "LL2" belongs to the lowest frequency area. Frequency components "HL2", "LH2", and "HH2" belong to the intermediate lower frequency area.

FIG. 2 (*b*) illustrates frequency coefficients according to secondary wavelet transform. Alternatively, another type of wavelet transform, e.g., tertiary wavelet transform, is acceptable.

As mentioned earlier, the characteristic information-calculating unit 103 selects the first frequency domain from among frequency components that have been quantized by the quantization unit 102. Pursuant to the present embodiment, the lowest frequency area (frequency component "LL2") is selected as the first frequency domain.

The characteristic information-calculating unit 103 calculates the characteristic information on the basis of coefficient data of frequency component "LL2" through a predetermined arithmetic process.

Pursuant to the present embodiment, the intermediate lower frequency area (frequency components "HL2", "LH2", and "HH2") is selected as the second frequency domain. The characteristic information (hash value "H") is embedded into frequency components "HL2", "LH2", and "HH2" in accordance with predetermined rules.

The frequency coefficients at the lower frequency area are resistant to change when the compressed image data experiences irreversible image processing. This means that the characteristic information is embedded into the lower frequency area that is resistant to change when the compressed image data undergoes the image processing. This feature ensures that the characteristic information is retained at the lower frequency area without being deleted from the lower frequency area.

Figure 3A:
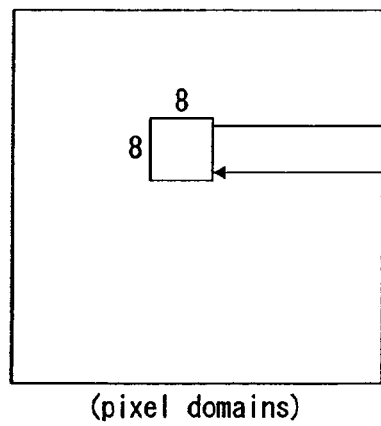
FIG. 3 (a) is a descriptive illustration showing an original image before discrete cosine transform is executed according to the present invention.
Figure 3B:
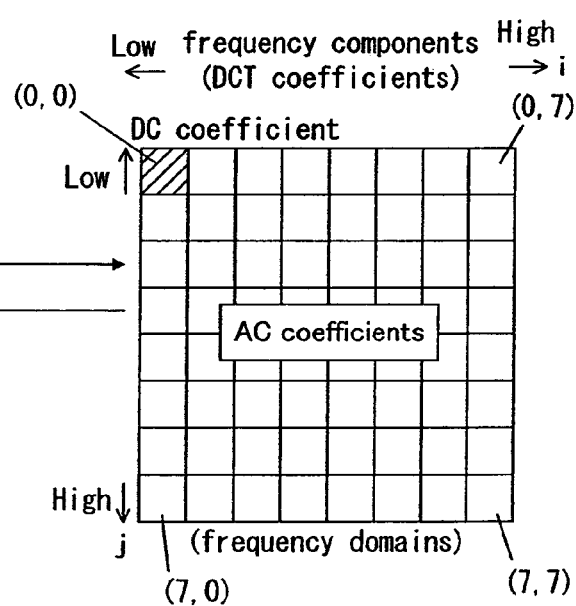

The following discusses, with reference to FIG. 3, how the discrete cosine transform (DCT) is employed as frequency transformation.

The discrete cosine transform (DCT) is more preferred when JPEG or MPEG is employed as an image-encoding system. This is because there are many cases where transformation elements for use in DCT/IDCT (inverse DCT) have already been implemented. Accordingly, existing circuits or elements may conveniently be used. This feature limits an increase in scale.

FIG. 3 (*a*) shows an original image. FIG. 3 (*b*) illustrates DCT coefficients after each rectangular block (8*8 pixels) as illustrated in FIG. 3 (*a*) is transformed.

In FIG. 3 (*b*), a frequency increases when abscissa "i" and ordinate "j" are positioned even closer to "7", but decreases when abscissas "i" and ordinate "j" are located even closer to "zero". A coefficient defined by (i, j)=(0,0) is a direct current (DC) coefficient. The remaining coefficients are all alternating current (AC) coefficients. A coefficient (7,7) belongs to a highest frequency domain. A coefficient (0,0) belongs to a lowest frequency domain.

When the discrete cosine transform is employed, then it is recommendable that a total of sixty-three AC coefficients (=all of the blocks (8*8 pixels)—the single DC coefficient) are preferably selected as a first frequency domain, and that the DC coefficient is chosen as a second frequency coefficient.

Alternatively, the DC coefficient may be used as the first frequency domain, while several AC coefficients positioned adjacent to the DC coefficient are used as the second frequency domain.

The characteristic information may be embedded by any well-known art. Alternatively, it may be embedded using bit planes as shown in FIG. 4.

Figure 4:
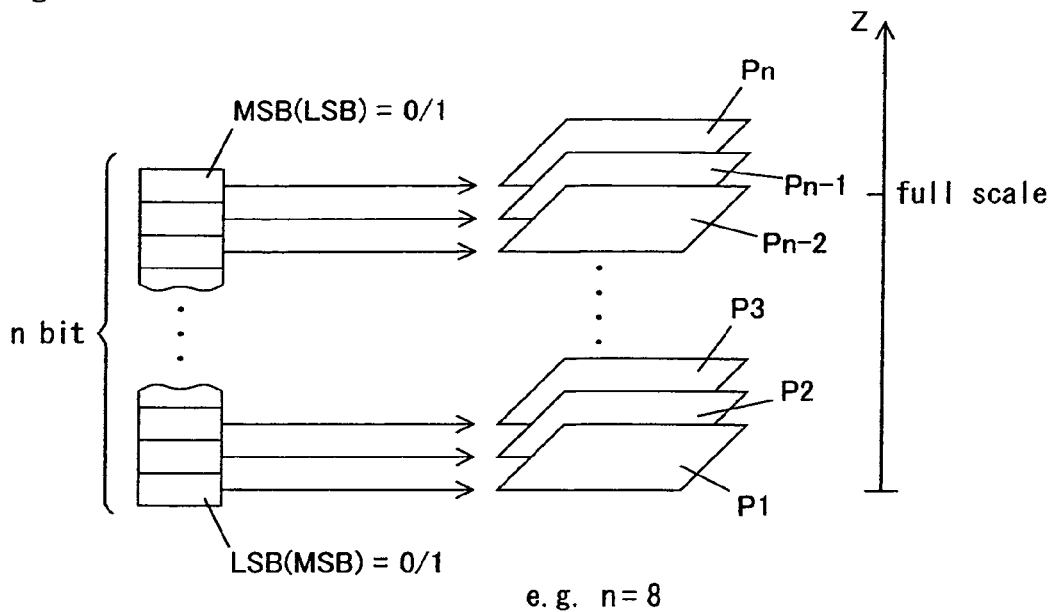
FIG. 4 is a descriptive illustration, showing how characteristic information is embedded into bit planes according to the present invention.

FIG. 4 is an illustration showing a relationship between the bit planes and the characteristic information according to present embodiment. Frequency coefficients "LL2" to "HH1" as illustrated in FIG. 2 (*b*) have height component "z" with reference to a "x"-"y" plane that is parallel to a paper surface of FIG. 2 (*b*).

As shown in FIG. 4, when height component "z" is expressed by "n"-bits (e.g., "n"=8), then LSB (or MSB) is allocated to a first bit plane "P1". Similarly, MSB (or LSB) is allocated to a bit plane "Pn" that has the number of "n" from the bit plate "P1".

In this way, the characteristic information can be embedded into an appropriate bit plane. This is encompassed by the present embodiment.

The bit plane is usable in many different manners. For example, it is recommendable that characteristic information is obtained from a MSB bit plate that is used as the first frequency coefficient, and that the obtained characteristic information is embedded into a bit plane next to MSB. The bit plane next to MSB is used as the second frequency coefficient.

Figure 5:
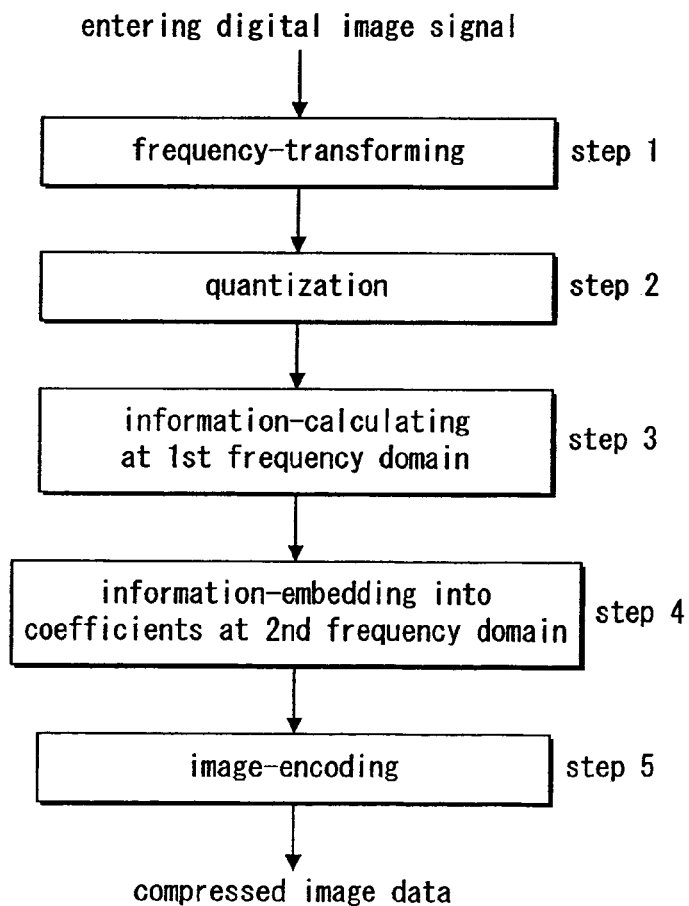
FIG. 5 is a flow chart illustrating how the information-embedding apparatus according to the first embodiment is operated.

The following discusses, with reference to FIG. 5, the way in which the information-embedding apparatus according to the present embodiment is operated. FIG. 5 is a flow chart illustrating how the same information-embedding apparatus behaves.

At step 1, the frequency-transforming unit 101 practices the frequency transformation of an entered digital image signal, thereby providing frequency coefficients.

At step 2, the quantization unit 102 quantizes the frequency coefficients from the frequency-transforming unit 101 in accordance with a quantization step size that complies with predetermined rules.

At step 3, the characteristic information-calculating unit 103 calculates characteristic information (hash value "H") on the basis of a coefficient at the first frequency domain.

At step 4, the information-embedding unit 104 handles the characteristic information (hash value "H") from the characteristic information-calculating unit 103 in accordance with predetermined rules, thereby embedding the characteristic information (hash value "H") into coefficients at the second frequency domain. The second frequency domain differs from the first frequency domain.

At step 5, the image-encoding unit 105 encodes the frequency coefficients that exhibit several frequency components, thereby producing compressed image data.

As described above, the information-embedding apparatus according to the present embodiment is operable to calculate the hash value directly from the frequency coefficient that is obtained by the frequency transformation of the digital image signal, and to handle the frequency coefficient in accordance with the predetermined rules, thereby embedding the hash value into the frequency coefficient.

More specifically, the information-embedding apparatus according the present embodiment provides such embedment in the process of image encoding. This feature makes it feasible to more simply detect possible tamper in the compressed image data, and further provides an affinity to the image encoding.

A combination of selecting the frequency domains from the several frequency components is not limited to that according to the present embodiment. More specifically, a simple combination of different first and second frequency domains is acceptable. For example, frequency components "LL2" and "HH2" may be selected as the first and second frequency domains, respectively. This means that not all of the frequency components may be selected.

Second Embodiment

Figure 6:
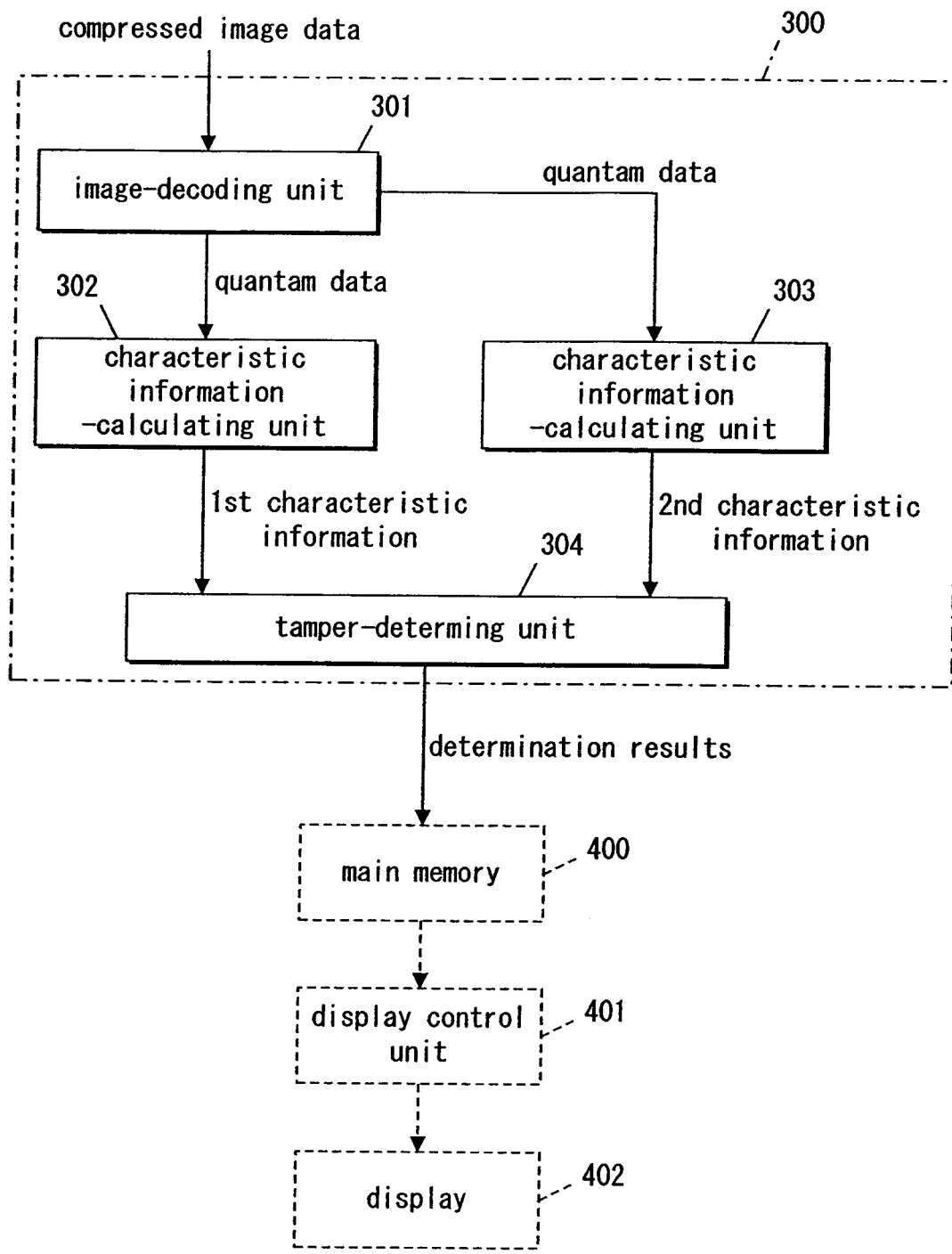
FIG. 6 is a block diagram illustrating a tamper-detecting apparatus according to a second embodiment.

FIG. 6 is a block diagram illustrating a tamper-detecting apparatus according to a second embodiment. The tamper-detecting apparatus 300 according the present embodiment cooperates with the information-embedding apparatus according to the previous embodiment. First and second characteristic information are hash values derived from an original value.

As illustrated in FIG. 6, the tamper-detecting apparatus 300 includes an image-decoding unit 301, a characteristic information-calculating unit 302, a characteristic information-extracting unit 303, and a tamper-determining unit 304.

The image-decoding unit 301 decodes compressed image data, thereby providing frequency coefficients (quantum data). In other words, all that is actually required of the image-decoding unit 301 is to provide the frequency coefficients. Accordingly, a inverse quantization unit and a variable length-decoding unit are inessential for the image-decoding unit 301.

The frequency coefficients as given above are quantized frequency component data that are provided while the compressed image data is decoded.

First and second frequency domains are preferably lower frequency domains or an intermediate lower frequency domain, both of which are lower in frequency than a highest frequency domain.

The characteristic information-calculating unit 302 calculates first characteristic information in accordance with the frequency coefficients (quantum data) from the image-decoding unit 301, and then sends out the calculated first characteristic information to the tamper-determining unit 304.

The characteristic information-extracting unit 303 calculates second characteristic information in accordance with the frequency coefficients (quantum data) from the image-decoding unit 301, and then feeds the calculated second characteristic information into the tamper-determining unit 304.

The tamper-determining unit 304 compares the second characteristic information with the first characteristic information to determine whether or not the compressed image data has been falsified. More specifically, when such a comparison reveals that the first characteristic information is in conformity with the second characteristic information, then the tamper-determining unit 304 determines that the compressed image data has been non-altered.

The determination results from the tamper-determining unit 304 are placed into a main memory 400, and are then displayed on a display 402. The main memory 400 is located outside of the tamper-detecting apparatus 300. A display control unit 401 controls the display 402.

Figure 7:
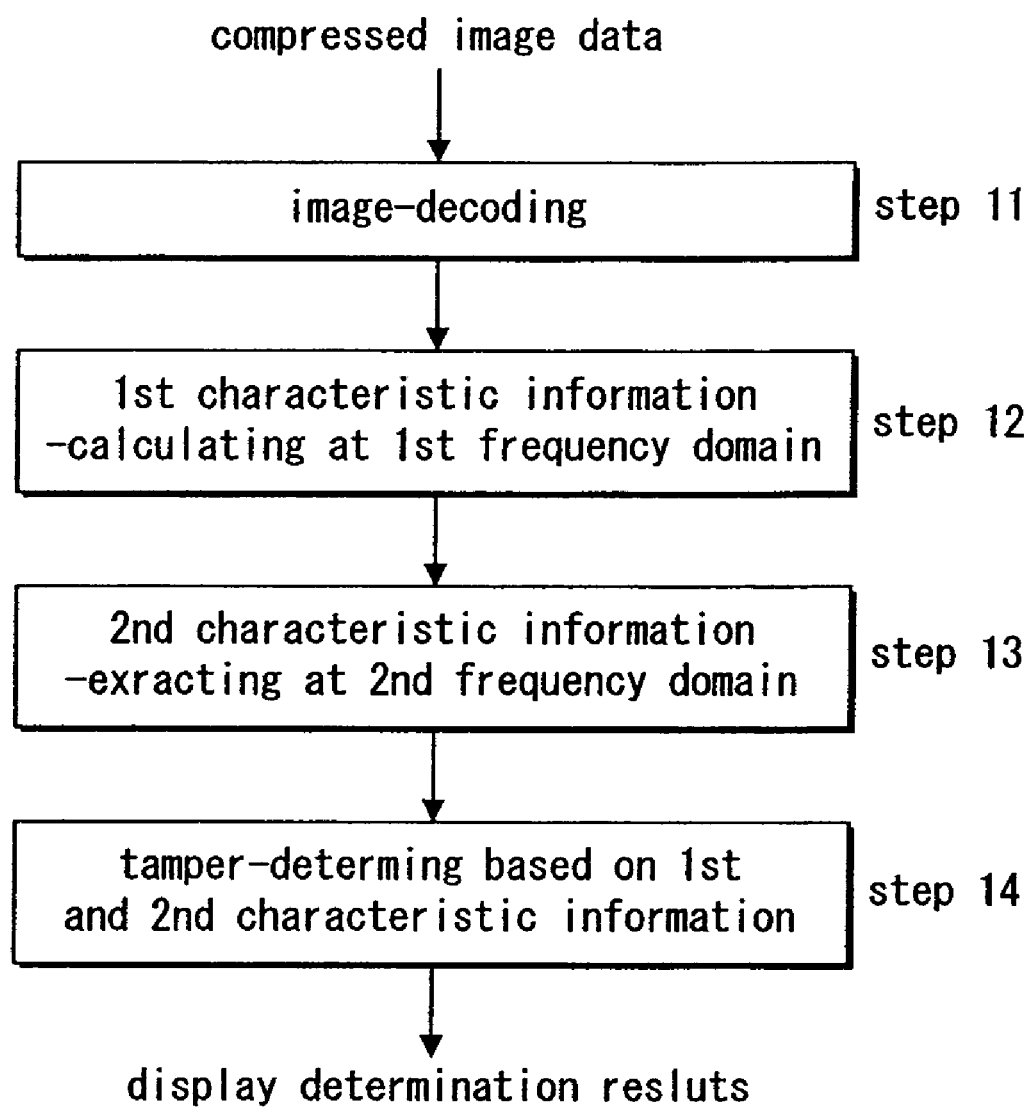
FIG. 7 is a flow chart illustrating how the tamper-detecting apparatus according to the second embodiment is operated.

The following describes, with reference with FIG. 7, the way in which the tamper-detecting apparatus according to the present embodiment is operated. FIG. 7 is a flow chart illustrating how the same tamper-detecting apparatus behaves.

At step 11, the image-decoding unit 301 decodes the compressed image data in a predetermined manner, thereby providing quantum data. The image-decoding unit 301 feeds the quantum data into both of the characteristic information-calculating unit 302 and the characteristic information-extracting unit 303.

At step 12, the characteristic information-calculating unit 302 calculates the first characteristic information on the basis of components at the first frequency domain among the quantum data.

Hash value H1 is calculated, as the characteristic information, from coefficient data at the entire first frequency domain.

At step 13, the characteristic information-extracting unit 303 extracts the second characteristic information from components at the second frequency domain among the quantum data.

At step 14, the tamper-determining unit 304 compares the second characteristic information from the characteristic information-extracting unit 303 with the first characteristic information from the characteristic information-calculating unit 302. When the first characteristic information is coincident with the second characteristic information, then the tamper-determining unit 304 determines that no change has been made to target compressed image data.

When the second characteristic information does not accord with the first characteristic information, then the tamper-determining unit 304 determines that the compressed image data has been tampered with.

The determination results from the tamper-determining unit 304 are at first placed into the memory 400, and are then displayed on the display 402 through the display control unit 401.

As described above, the tamper-detecting apparatus according to the present embodiment is able to determine possible tamper directly from the frequency components that are provided while the compressed image data is decoded in a predetermined manner.

This feature makes it feasible to more simply detect the possible tamper in the compressed image data before the compressed image data is completely decoded.

Third Embodiment

Figure 8:
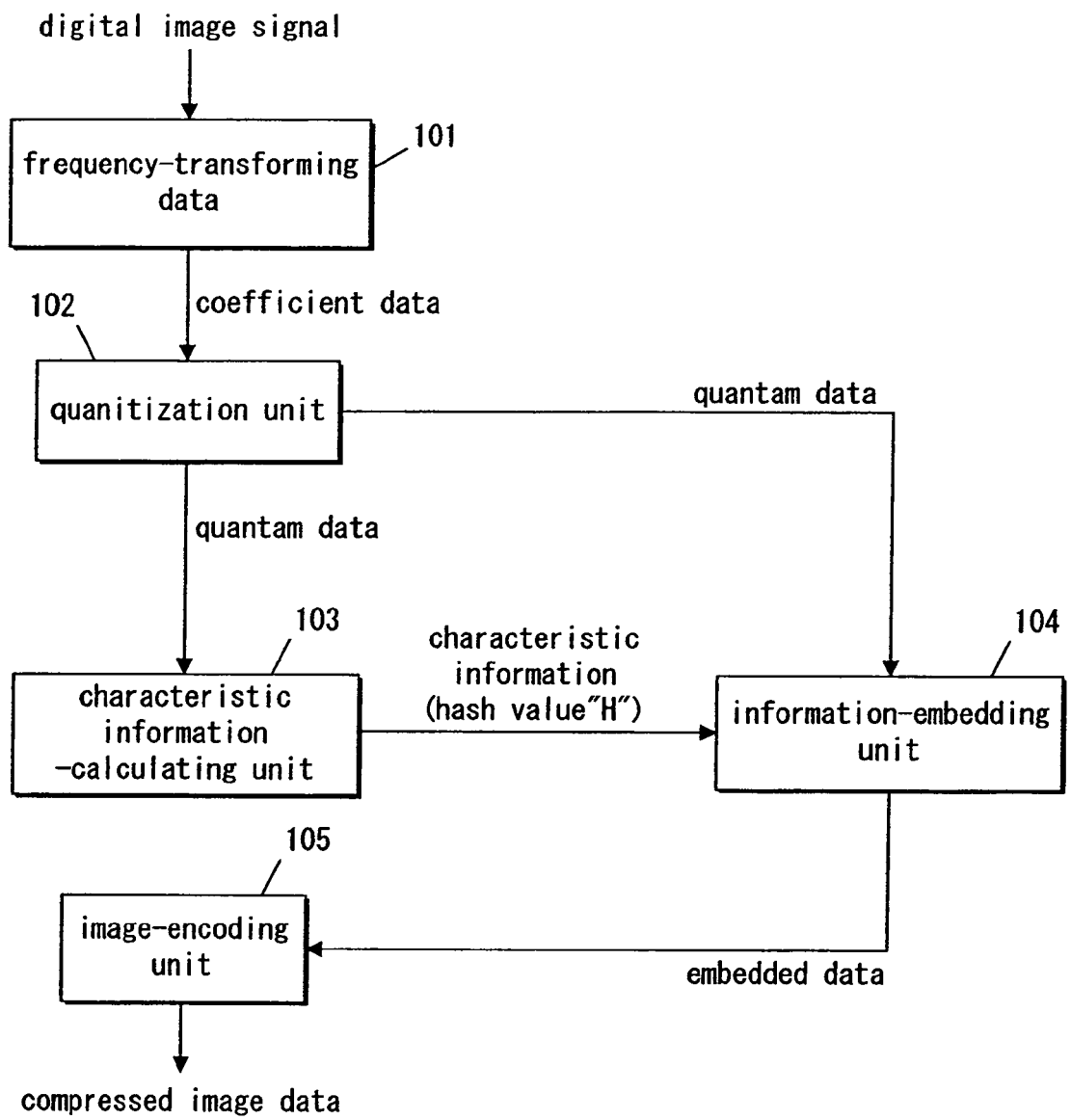
FIG. 8 is a block diagram illustrating an information-embedding apparatus according to a third embodiment.

FIG. 8 is a block diagram illustrating an information-embedding apparatus according to a third embodiment. As illustrated in FIG. 8, the information-embedding apparatus according to the present embodiment includes a frequency-transforming unit 101, a quantization unit 102, a characteristic information-calculating unit 103, an information-embedding unit 104, and an image-encoding unit 105.

The above units except for the information-embedding unit 104 are similar in construction to those described in the first embodiment. The same reference characters are hereinafter given for components common to those described in the first embodiment. Therefore, descriptions related thereto will be omitted. The following mainly discusses differences between the present embodiment and the first embodiment.

The information-embedding unit 104 embeds characteristic information into both quantum data at a second frequency domain and quantum data at a third frequency domain, thereby providing embedded data.

A first frequency domain, the second frequency domain, and the third frequency domain differ from each other. The first and second frequency domains are lower frequency areas. The third frequency domain is a higher frequency area.

Pursuant to the present embodiment, as illustrated in FIG. 2 (*b*), a lowest frequency area (frequency component "LL2") is selected as the first frequency domain.

An intermediate lower frequency area (frequency component "HL2", "LH2", and "HH2") is selected as the second frequency domain. A higher frequency area (frequency components "HL1", "LH1", and "HH1") is selected as the third frequency domain.

Frequency components "HL1", "LH1", and "HH1" at the higher frequency area are lower in robustness with image processing such as image compression. The robustness exhibits a degree at which a processed image retains information therein.

Frequency components "HL2", "LH2", and "HH3" at the intermediate lower frequency area are higher in such robustness. Frequency component "LL2" at the lowest frequency area is highest in robustness.

When image data experiences irreversible image processing, then there may occur variations in frequency component at the third frequency domain that is the higher frequency area having lower robustness. At the same time, no variations are usually seen in frequency component at the first frequency domain (the intermediate lower frequency area) as well as that at the second frequency domain (the lowest frequency area).

However, the frequency components at all of the frequency domains will vary when the image data is intentionally altered, e.g., such as by replacing a person's face in image with another. More specifically, the frequency components at the first and second frequency domains will vary as well as those at the third frequency domain.

As a result, when there is a change in frequency area having higher robustness (more specifically, the first and second frequency domains), then it is determined that the image data has intentionally been falsified.

Meanwhile, when there is a change in frequency area having lower robustness (more specifically, the third frequency domain), not in a frequency area having higher robustness, then it is determined that the image data has experienced the irreversible image processing, not intentional tamper.

Pursuant to the present embodiment, the characteristic information-calculating unit 103 calculates characteristic information (hash value "H") on the basis of quantum data of frequency component "LL2" at the first frequency domain.

The information-embedding unit 104 embeds the characteristic information (hash value "H") in a manner similar to that described in the first embodiment into the frequency components (HL2, LH2, and HH2) at the second frequency domain and the frequency components (HL1, LH1, and HH1) at the third frequency domain.

Figure 9:
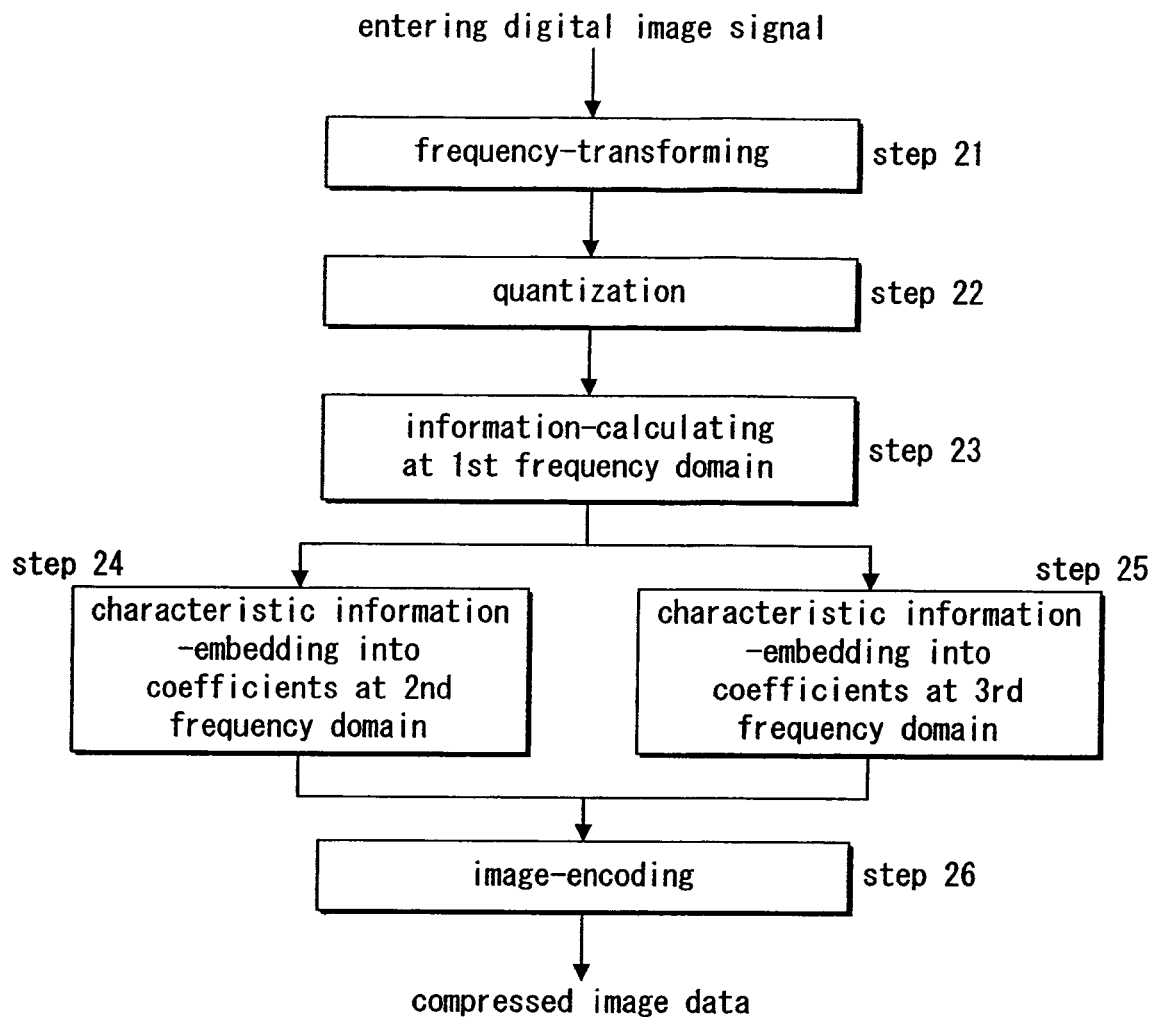
FIG. 9 is a flow chart illustrating how the information-embedding apparatus according to the third embodiment is operated.

The following discusses, with reference to FIG. 9, the way in which the information-embedding apparatus according to the present embodiment is operated. FIG. 9 is a flow chart illustrating how the same information-embedding apparatus behaves.

At step 21, the frequency-transforming unit 101 practices the frequency transformation of an entered digital image signal, thereby providing frequency coefficients.

At step 22, the quantization unit 102 quantizes the frequency coefficients from the frequency-transforming unit 101 in a quantization step size that conforms to predetermined rules, thereby providing quantum data.

At step 23, the characteristic information-calculating unit 103 calculates characteristic information (hash value "H") in accordance with the quantum data of frequency component "LL2" at the first frequency domain.

At steps 24 to 25, the information-embedding unit 104 embeds the characteristic information (hash value "H") into the frequency components (HL2, LH2, and HH2) at the second frequency domain and the frequency components (HL1, LH1, and HH1) at the third frequency domain, thereby providing embedded data.

At step 26, the image-encoding unit 105 encodes the embedded data in accordance with the frequency components having the characteristic information embedded therein, thereby generating compressed image data.

As described above, the information-embedding apparatus according to the present embodiment is operable to calculate a hash value directly from a frequency coefficient that is obtained by the frequency transformation of the digital image signal, and to embed the hash value into the frequency coefficient by handling the frequency coefficient in accordance with predetermined rules.

As a result, the information-embedding apparatus according to the present embodiment is operable to embed the characteristic information in the process of image encoding. This feature makes it feasible to more easily detect possible tamper in compressed image data, and further provides an affinity to the image encoding.

A combination of selecting the frequency domains from among the several frequency components is not limited to that described in the present embodiment. In short, the first and second frequency domains must differ from one another.

The first frequency domain is preferably a lowest or intermediate lower frequency component. The second frequency domain is the lowest or intermediate lower frequency component. The third frequency domain is the intermediate lower frequency component except for the lowest frequency component.

Fourth Embodiment

Figure 10:
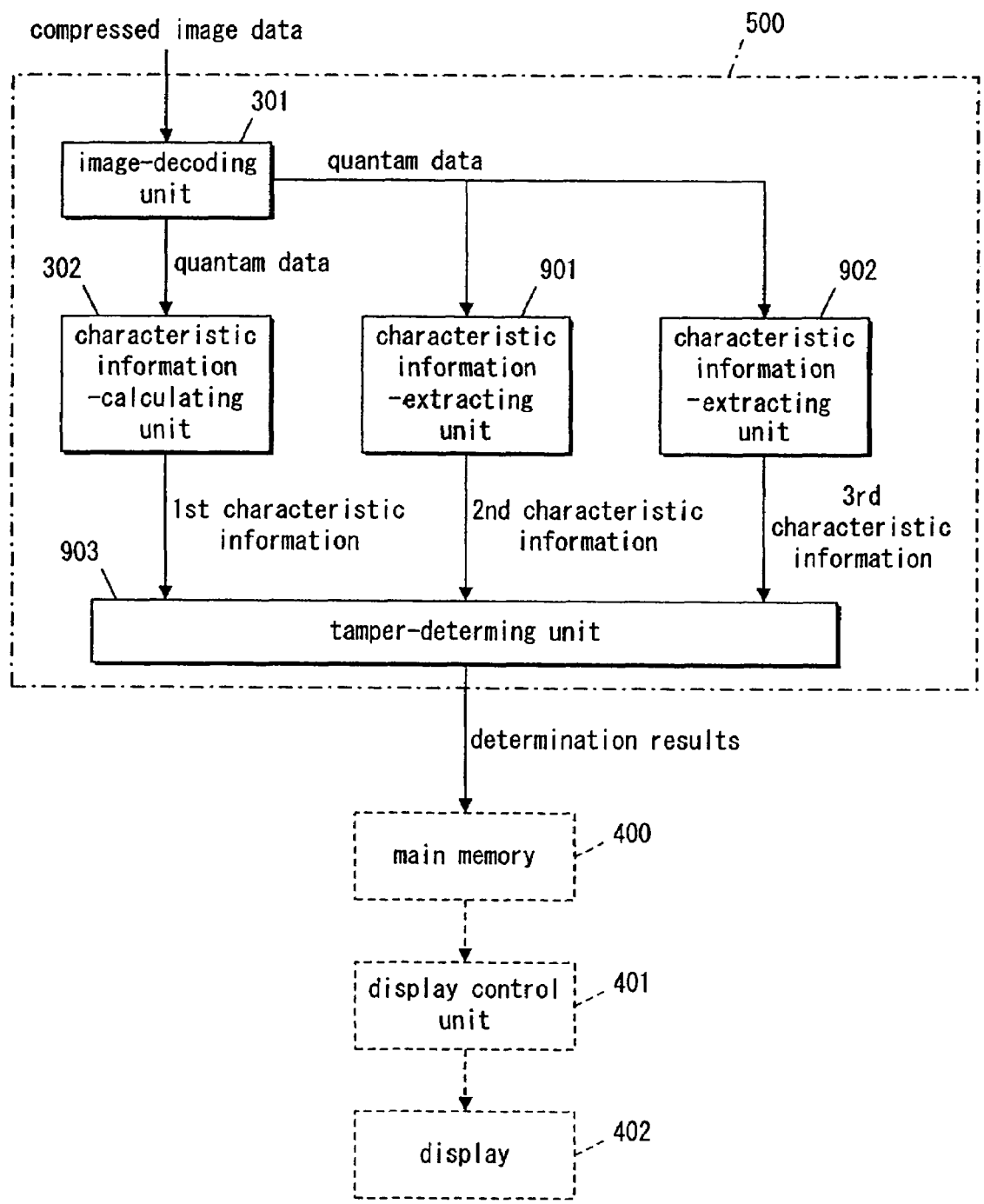
FIG. 10 is a block diagram illustrating a tamper-detecting apparatus according to a fourth embodiment.

FIG. 10 is a block diagram illustrating a tamper-detecting apparatus according to a fourth embodiment. The tamper-detecting apparatus 500 according to the present embodiment works with the information-embedding apparatus according the third embodiment. First, second, and third characteristic information are hash values derived from an original value.

The same reference characters are hereinafter given for components common to those described in the second embodiment; therefore, descriptions related thereto will be omitted. The following mainly discusses differences between the present embodiment and the second embodiment.

As illustrated in FIG. 10, the tamper-detecting apparatus 500 includes an image-decoding unit 301, a characteristic information-calculating unit 302, characteristic information-extracting units 901 and 902, and a tamper-determining unit 903.

In FIG. 10, the image-decoding unit 301 decodes compressed image data, thereby providing frequency coefficients.

The characteristic information-calculating unit 302 calculates the first characteristic information in accordance with the frequency coefficients from the image-decoding unit 301.

The characteristic information-extracting unit 901 calculates the second characteristic information in accordance with the frequency coefficients from the image-decoding unit 301. The characteristic information-extracting unit 902 calculates the third characteristic information in accordance with the frequency coefficients from the image-decoding unit 301.

The tamper-determining unit 903 selectively compares two or greater different pieces of characteristic information from among the first, second, and third characteristic information with each other to determine whether or not the compressed image data has been falsified.

When the second characteristic information agrees with the first characteristic information, and when the first characteristic information is coincident with the third characteristic information, then the tamper-determining unit 903 determines that no alteration has been made to the compressed image data.

As discussed in the third embodiment, the second frequency domain is higher in frequency than the first frequency domain, while the third frequency domain is higher in frequency than the second frequency domain.

When the second characteristic information agrees with the first characteristic information, but when the first characteristic information differs from the third characteristic information, then the tamper-determining unit 903 determines that the compressed image data has experienced image processing, not tamper.

The tamper-detecting apparatus according to the present embodiment cooperates with the information-embedding apparatus according to the third embodiment. Similarly to the third embodiment, the tamper-detecting apparatus according to the present embodiment establishes frequency domains as described below.

First, second, and third frequency domains differ from each other. The first and second frequency domains are lower frequency areas. The third frequency domain is a higher frequency area.

Pursuant to the present embodiment, a lowest frequency area (frequency component "LL2" of FIG. 2 (b)) is selected as the first frequency domain.

An intermediate lower frequency area (frequency components "HL2", "LH2", and "HH2") is selected as the second frequency domain. A higher frequency area (frequency components "HL1", "LH1", and "HH1") is selected as the third frequency domain.

The first characteristic information is hash value "H1" calculated by the characteristic information-calculating unit 302 in accordance with the first frequency domain (frequency component "LL2").

The second characteristic information is hash value "H2" calculated by the characteristic information-extracting unit 901 in accordance with the second frequency domain (frequency components "HL2", "LH2", and "HH2").

The third characteristic information is hash value "H3" calculated by the characteristic information-extracting unit 902 in accordance with the third frequency domain (frequency components "HL1", "LH1", and "HH1").

Figure 11:
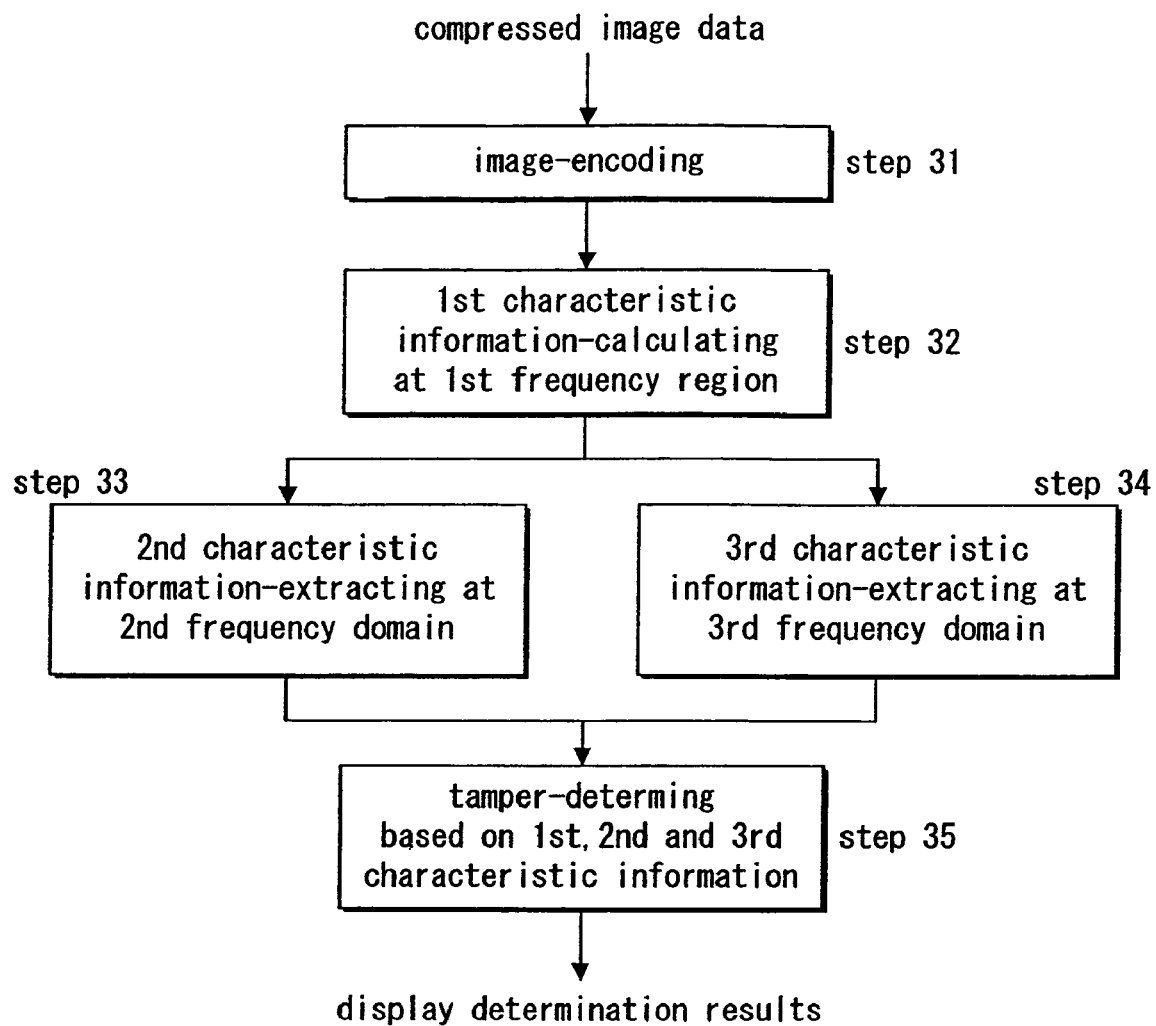
FIG. 11 is a flow chart illustrating how the tamper-detecting apparatus according to the fourth embodiment is operated.

The following describes, with reference to FIG. 11, the way in which the tamper-detecting apparatus according to the present embodiment is operated. FIG. 11 is a flow chart illustrating how the same tamper-detecting apparatus behave.

At step 31, the image-decoding unit 301 decodes compressed image data, thereby providing quantized frequency coefficients (quantum data).

At step 32, the characteristic information-calculating unit 302 calculates the first characteristic information (hash value "H1") in accordance with components at the first frequency domain among the quantum data.

At step 33, the characteristic information-extracting unit 901 calculates the second characteristic information (hash value "H2") in accordance with components at the second frequency domain among the quantum data.

At step 34, the characteristic information-extracting unit 902 calculates the third characteristic information (hash value "H3") in accordance with components at the third frequency domain among the quantum data.

At step 35, the tamper-determining unit 903 compares such three different pieces of characteristic information (hash value "H1", "H2", and "H3") with each other. When the three different pieces of characteristic information are coincident with each other, then the tamper-determining unit 903 determines that no alteration has been made to target compressed image data.

As described in the third embodiment, when there occurs a change in frequency area having higher robustness (more specifically, the first and second frequency domains), then it is determined that the compressed image data has been falsified on purpose.

Meanwhile, when there occurs no change in frequency area having higher robustness, but when there occurs a change in frequency area having lower robustness (more specifically, the third frequency domain), then it is determined that the compressed image data experiences irreversible image processing, not intentional tamper.

In short, (a) for H2=H3=H1, it is determined that no tamper has been made to the image data;

(b) for H2=H1, but H3≠H1, it is determined that the image data has been changed by image processing, not by intentional tamper; and (c) for H2≠H1, and H3≠H1, it is determined that the image data has intentionally been tampered with.

As discussed above, the tamper-detecting apparatus according to the present embodiment is possible to distinguish the irreversible image processing from image tamper because hash values are embedded into coefficients of higher frequency components as well as into frequency coefficients of lower frequency components that are relatively resistant to change by the irreversible image processing, The following repeats essential points of the present embodiment. For example, when part of an image is falsified, there is a high possibility that all of the frequency coefficients ranging from the lower to higher coefficients may be varied. As a result, hash values "H1", "H2", and "H3" are all changed. Such a status makes a determination that the image has been dishonestly been altered.

When the image is processed such as by image compression, then the frequency coefficients of the lower frequency components are resistant to change, although the frequency coefficients of the higher frequency components may be varied. As a result, hash value "H1" is coincident with hash value "H2", and it is determined that the image has been non-tampered with.

When hash value "H2" accords with hash value "H1", but when hash value "H3" differs from hash value "H1", then there is a higher possibility that the image may have undergone the irreversible image processing. As a result, the irreversible image processing can be distinguished from the image tamper.

(Recording Medium)

Figure 12:
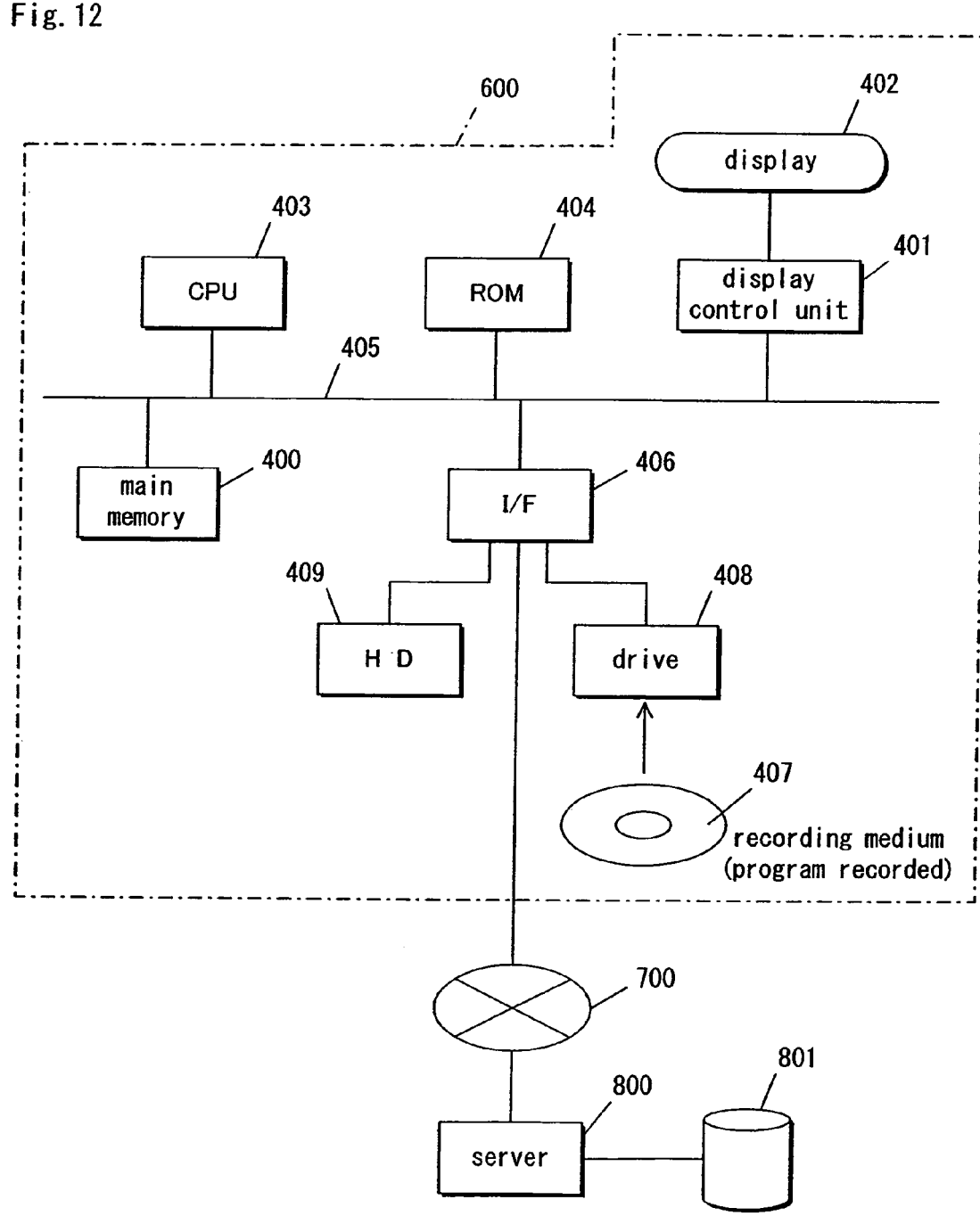
FIG. 12 is an exemplified illustration showing a system configuration that employs a recording medium according to the present invention.
Figure 13:
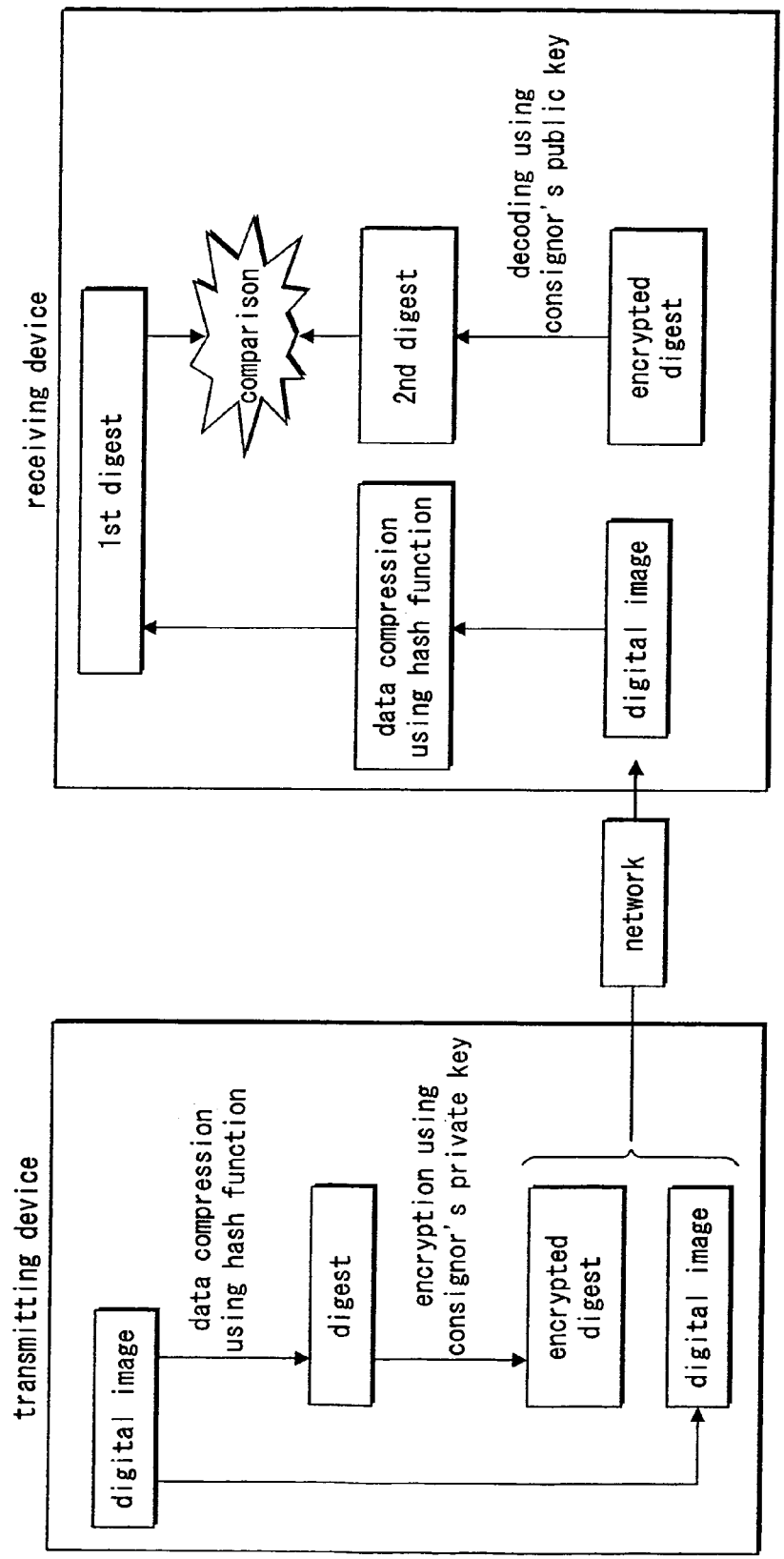
FIG. 13 is a schematic diagram illustrating a prior art electronic authentication system.
Figure 14A:
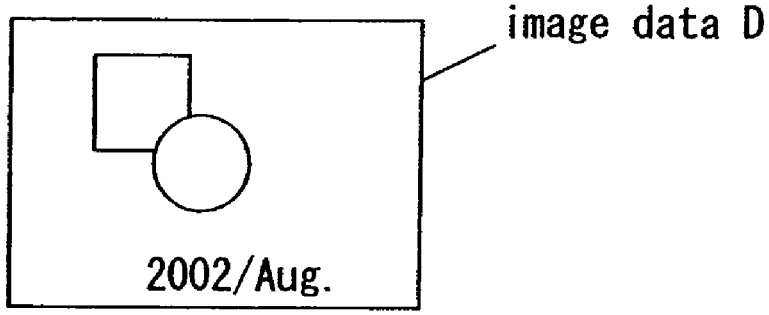
FIG. 14 (a) is a descriptive illustration showing how a prior art image authentication system is operated.
Figure 14B:
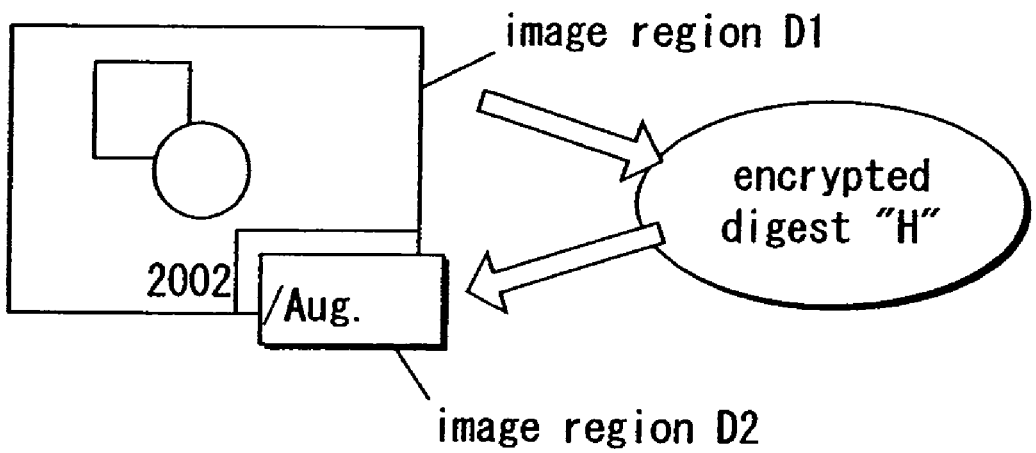
Figure 14C:
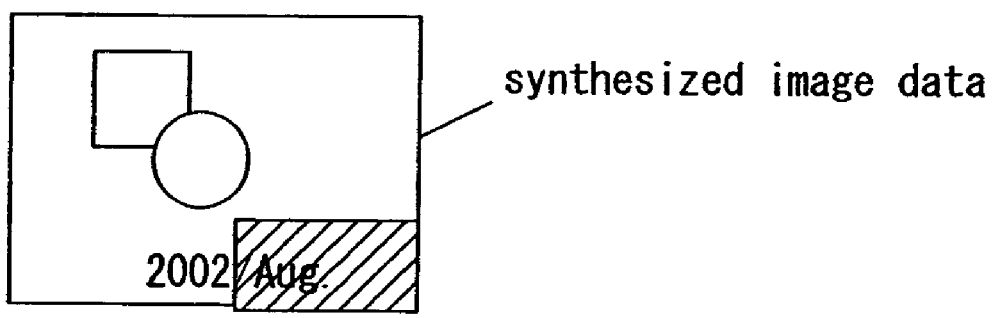

As illustrated in FIG. 12, various components in the information-embedding apparatus, encoder, and tamper-detecting apparatus as described in the first to fourth embodiments may be installed in a computer 600 after being fabricated as a program. Alternatively, a storage unit 801 connected to a server 800 can distribute the above program through a network 700.

In the program as mentioned above, part or whole of elements of the following units are implemented as a process or program module: the frequency-transforming unit 101; the quantization unit 102; the characteristic information-calculating units 103, 302; the information-embedding units 104, 701; the image-encoding unit 105; the characteristic information-calculation unit 302; the characteristic information-extracting units 901, 902; and the tamper-determining units 304, 903.

The program is typically contained in a recording medium 407 such as a CD-ROM (compact disk-read only memory) and a floppy disk. The program in the recording medium 407 is installed into a storage unit such as a hard disk 409 through a drive 408 and an interface 406.

A CPU 403 executes the program, while providing access to a ROM 404, a main memory 400, the hard disk 409 through a bus 405. Executing the program realizes the information-embedding apparatus, encoder, and tamper-detecting apparatus according to the first to fourth embodiments.

In conclusion, the present invention allows tamper-detecting information (a hash value) to be embedded into compressed image data while the compressed image data is being processed. This feature makes it feasible to more easily detect possible tamper in the compressed image data.

The present invention has an affinity to image encoding. The present invention is possible to verify the detection of the possible tamper without the need to completely decode the compressed image data.

The present invention is possible to distinguish irreversible image processing from image tamper.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A tamper-detecting apparatus comprising:

a characteristic information-calculating unit operable to calculate first characteristic information according to a frequency coefficient at a first frequency domain from a plurality of frequency coefficients obtained by a frequency transformation of a digital image signal;

a characteristic information-extracting unit operable to extract second characteristic information according to a second frequency coefficient at a second frequency domain from the plurality of frequency coefficients obtained by the frequency transformation of the digital image signal, and operable to extract third characteristic information according to a third frequency coefficient at a third frequency domain from the plurality of frequency coefficients obtained by the frequency transformation of the digital image signal; and a tamper-determining unit operable to calculate a first comparison result obtained by comparing the first characteristic information and the second characteristic information, operable to calculate a second comparison result obtained by comparing the first characteristic information and the third characteristic information, and operable to determine one of a presence of tampering or changing by image processing according to the first comparison result and the second comparison result, wherein:

the second frequency domain is different from the first frequency domain;

the third frequency domain is different from the first frequency domain and the second frequency domain;

the second frequency domain is higher in frequency than the first frequency domain; and the third frequency domain is higher in frequency than the first frequency domain and the second frequency domain.

2. The tamper-detecting apparatus as defined in claim 1, wherein said tamper-determining unit is operable to determine the presence of a change, based on image processing, of the digital image signal, when the first characteristic information is coincident with the second characteristic information and the first characteristic information is not coincident with the third characteristic information.

3. The tamper-detecting apparatus as defined in claim 1, wherein said tamper-determining unit is operable to determine the presence of tampering of the digital image signal, when the first characteristic information is not coincident with the second characteristic information and the first characteristic information is not coincident with the third characteristic information.

4. The tamper-detecting apparatus as defined in claim 1, wherein said tamper-determining unit is operable to determine that there has been no tampering of the digital image signal and that there has been no change, based on image processing, of the digital image signal, when the first characteristic information is coincident with the second characteristic information and the first characteristic information is coincident with the third characteristic information.

5. The tamper-detecting apparatus as defined in claim 1, further comprising a quantization unit operable to quantize the plurality of frequency coefficients and provide quantum data, wherein:
   the first frequency coefficient is based on first quantum data obtained by quantizing the frequency coefficient included in the first frequency domain;
   the second frequency coefficient is based on second quantum data obtained by quantizing the frequency coefficient included in the second frequency domain; and
   the third frequency coefficient is based on third quantum data obtained by quantizing the frequency coefficient included in the third frequency domain.

6. The tamper-detecting apparatus as defined in claim 1, wherein the first frequency domain is lower in frequency than a highest frequency domain.

7. The tamper-detecting apparatus as defined in claim 1, wherein the second frequency domain is lower in frequency than a highest frequency domain.

8. The tamper-detecting apparatus as defined in claim 1, wherein the third frequency domain is higher in frequency than a lowest frequency domain.

9. The tamper-detecting apparatus as defined in claim 1, wherein the frequency transformation comprises a frequency transformation selected from a group consisting of discrete wavelet transformation, subband decomposition, discrete cosine transformation, and Fourier transformation.

10. The tamper-detecting apparatus as defined in claim 1, wherein the characteristic information is an inherently expressible original value.

11. The tamper-detecting apparatus as defined in claim 1, wherein the characteristic information is a hash value derived from an original value.

12. A tamper-detecting method comprising:
   calculating first characteristic information according to a first frequency coefficient at a first frequency domain from a plurality of frequency coefficients obtained by a frequency transformation of a digital image signal;
   extracting second characteristic information according to a second frequency coefficient at a second frequency domain from the plurality of frequency coefficients obtained by the frequency transformation of the digital image signal, the second frequency domain being different from the first frequency domain;
   extracting third characteristic information according to a third frequency coefficient at a third frequency domain from the plurality of frequency coefficients obtained by the frequency transformation of the digital image signal, the third frequency domain being different from the first frequency domain and the second frequency domain;
   calculating a first comparison result obtained by comparing the first characteristic information and the second characteristic information;
   calculating a second comparison result obtained by comparing the first characteristic information and the third characteristic information; and
   determining one of a presence of tampering or changing by image processing according to the first comparison result and the second comparison result, wherein:
   the second frequency domain is higher infrequency than the first frequency domain; and
   the third frequency domain is higher in frequency than the first frequency domain and the second frequency domain.

13. A computer-readable storage medium having stored thereon a tamper-detecting computer program for causing a computer to execute a method comprising:
   calculating first characteristic information according to a first frequency coefficient at a first frequency domain from a plurality of frequency coefficients obtained by a frequency transformation of a digital image signal;
   extracting second characteristic information according to a second frequency coefficient at a second frequency domain from the plurality of frequency coefficients obtained by the frequency transformation of the digital image signal, the second frequency domain being different from the first frequency domain;
   extracting third characteristic information according to a third frequency coefficient at a third frequency domain from the plurality of frequency coefficients obtained by the frequency transformation of the digital image signal, the third frequency domain being different from the first frequency domain and the second frequency domain;
   calculating a first comparison result obtained by comparing the first characteristic information and the second characteristic information;
   calculating a second comparison result obtained by comparing the first characteristic information and the third characteristic information; and
   determining one of a presence of tampering or changing by image processing according to the first comparison result and the second comparison result, wherein:
   the second frequency domain is higher infrequency than the first frequency domain; and
   the third frequency domain is higher in frequency than the first frequency domain and the second frequency domain.

* * * * *